April 20, 1948.  A. D'HALLOY  2,440,079
REFRIGERATING MACHINE
Filed Aug. 29, 1939
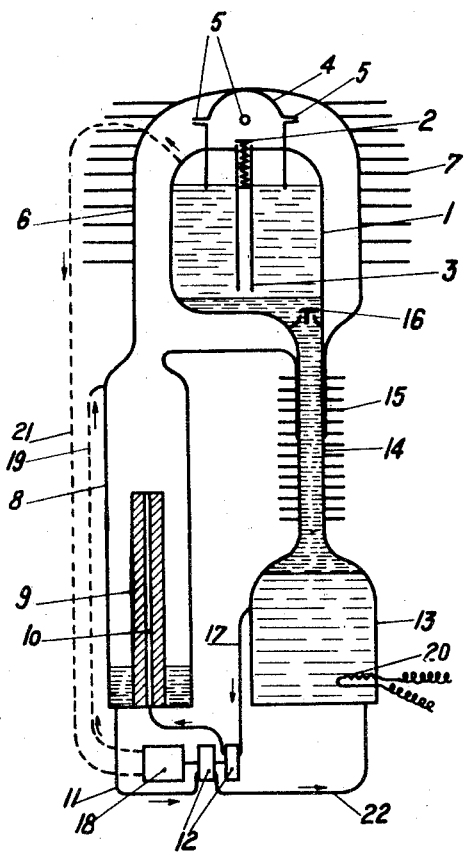
Inventor,
A. d'Halloy
by: Glascock Downing & Seebold
Attys.

Patented Apr. 20, 1948

2,440,079

UNITED STATES PATENT OFFICE 2,440,079

REFRIGERATING MACHINE

Audoin d'Halloy, Paris, France

Application August 29, 1939, Serial No. 292,497
In Luxemburg September 13, 1938

Section 3, Public Law 690, August 8, 1946
Patent expires September 13, 1958

8 Claims. (Cl. 62—5)

The invention relates to refrigerating apparatus of the type known as absorption machines, employed for all kinds of domestic and industrial applications. In the description which follows ammonia only will be referred to, in order to simplify the explanation, but it is of course to be understood that any other fluid cold-producing substance, which is soluble and easily liquifiable, can be employed.

An object of the invention is to simplify the construction of the refrigerating machines of this type, and to make their operation more economical, which is of very special importance where domestic refrigerators come into question.

The apparatus comprises two separate receptacles, one for the solution of ammonia, or other cold-producing fluid, in water or other solvent, and the other for the liquid ammonia, the tank containing the ammoniacal solution being connected to the liquid ammonia tank by an intermediate vessel filled with a liquid such as oil, which is not miscible with water nor with liquid ammonia, and which is subjected to a cooling process.

The evaporation of the ammonia is not therefore a partial evaporation of an ammoniacal solution but that of liquid ammonia which is distinctly separated from the solution. There is, therefore, no risk of water vapour being carried along, and there is in consequence no need to make use of rectifiers.

The intermediate vessel, in the shape of a column, for example, is cooled either by the natural circulation of air or by making use of the cold which is produced in the evaporator.

The evaporation can be activated by the atomisation of the liquid ammonia in the evaporator.

The starting and the stopping are automatically ensured by utilising variations of the vapour pressure prevailing in the upper part of the liquid ammonia tank.

In this way, not only are all special thermostatic devices eliminated, but the quantity of ammonia which is evaporated is made a function of the temperature of the environment to be cooled.

The ammonia gas coming from the evaporator and the liquid intended to absorb it are placed in surface contact by means of a member such as a porous element or the like, and the quantity of absorbing liquid put into circulation is itself proportional to the quantity of ammonia gas to be dissolved, as a result of the variations of the vapour pressure in the liquid ammonia tank owing to the effect of the changes of temperature.

The motive power necessary for the putting of the liquids in circulation is obtained by employing ammonia gas taken from the upper part of the liquid ammonia tank, and the ammonia gas coming from the exhaust of the motor is again put into the circuit, which permits of the utilisation of the latent heat due to the expansion of this proper gas and the reduction of the temperature of the absorption liquid provides an increase in the absorptive power of the solution.

The liquid ammonia tank is arranged in the interior of the evaporator, or is otherwise cooled by it. One method of carrying out the invention is described below and is diagrammatically represented by way of example only in the accompanying drawing, but the invention is not limited thereto.

The apparatus comprises a receptacle 1, in which there is stored liquified ammonia, and which is closed at its upper part by a calibrated non-return valve 2. When lifted, this valve enables the liquid ammonia to pass through a tube 3 and move into an atomizing chamber 4, which is provided with nozzles 5 through which the jets of atomized liquid ammonia pass.

This liquid ammonia tank 1 is arranged concentrically within an evaporator 6, provided with fins 7, and of which the lower part is directly connected to an absorber vessel 8, in which there is arranged a porous element 9, similar to those used for filtration, and provided internally with a channel 10 intended for the circulation of the absorbing liquid, for example water.

The lower part of the absorber 8 is fitted with a pipe pipe 11 ending in the suction side of a pump 12, whose delivery is effected, through a pipe 22, to the lower part of a distillation vessel 13 containing the rich ammoniacal solution.

The upper part of the distillation vessel 13 is connected to the liquid ammonia tank 1 by means of a tube 14 provided with fins 15, a non-return valve 16 preventing the return of liquid ammonia to the distillation vessel 13. The water return pipe 17 from the distiller 13 is likewise connected to the suction side of the pump 12, which delivers the absorbing liquid to the interior of the channel 10 of the porous element 9.

This pump is actuated by a motor 18, pneumatic, turbine, or the like, whose operation is ensured by ammonia gas collected at the upper part of the tank 1 and fed to the motor 18 by a pipe 21, this gas, after its utilisation in the motor, being fed by a pipe 19 into the absorber 8.

In the distillation vessel 13 there is arranged a heating resistance 20.

If a certain quantity of water is introduced into the machine in the interior of the absorber 8, as well as in the distillation vessel 13, and then in this same vessel 13 a certain quantity of oil is immobilised in the tube 14 this oil remains above the water contained in the distiller 13 and the liquid ammonia is immobilised in the vessel 1. The operation is then as follows:

As soon as the temperature in the environment which is to be cooled attains the maximum predetermined temperature, the corresponding increase of pressure for the ammonia gas collected at the top part of the tank 1 results in the motor 18 being put into operation. At the same time, this same pressure, acting on the liquid ammonia, delivers a part of it into the tube 3, which brings about the lifting of the calibrated valve 2, and the result of this is that the liquid ammonia is introduced into the chamber 4 and from there into the atomizing nozzles 5.

This liquid ammonia thus atomized enters at once into its vaporisation phase, thus causing the reduction of the temperature of the evaporator 6. The ammonia gas goes, at the same time as that brought by the pipe 19 from the return exhaust 18, into the absorber 8. The absorption will be effected by the circulation of water in the porous element 9, this water charged with ammonia going by gravity to the bottom part of the absorber 8 from where, by means of the pipe 11 and the pump 12, it is delivered into the distillation vessel 13. The same quantity of water, retaken by the pipe 17 and the second body of the same pump 12, can be again sent into the interior of the porous element 9.

The heating resistance 20 will then bring about a rise of temperature, permitting the distillation of the ammoniacal solution.

The ammonia gas, thus liberated from the solution, will rise through the column 14 filled with oil, cooling itself by this passage. The ammonia gas lifts the non-return valve 16 and returns to the tank 1. The cycle which has thus been established will continue up to the moment when, owing to the fall in temperature of the whole aggregate, the pressure of ammoniacal gas contained in this tank 1 has returned to its normal value, which is a function of the regulating temperature and the valve 2 will remain closed for as long as the environment has not attained the maximum predetermined temperature.

It is well understood that, without departing from the scope of the invention, variations and improvements of details can be conceived, as well as the use of means which constitute equivalents of those which have been given by way of example.

I claim:

1. In refrigerating apparatus, a vessel having a solution of a refrigerant therein, a receptacle having liquid refrigerant therein, a tube connecting said vessel with said receptacle, a supply of liquid filling said tube, said liquid being immiscible with said solution of the refrigerant and immiscible with the liquid refrigerant, and means for cooling said tube.

2. In refrigerating apparatus, a vessel having a solution of ammonia therein, a receptacle having liquid ammonia therein, a tube communicating said vessel with said receptacle, a fluid within said tube filling the cross-section thereof, said fluid being immiscible with said ammonia solution and immiscible with the liquid ammonia, and means for cooling the fluid in said tube.

3. In refrigerating apparatus, a vessel having a solution of a refrigerant therein, a receptacle having liquid refrigerant therein, a tube communicating said vessel with said receptacle, a supply of fluid filling the cross-section of said tube, said fluid being immiscible with said solution of the refrigerant and immiscible with the liquid refrigerant, and an evaporator for cooling said tube.

4. In refrigerating apparatus, a vessel having a solution of a refrigerant therein, a receptacle having liquid refrigerant therein, a tube communicating said vessel with said receptacle, a supply of liquid filling the cross-section of said tube, said liquid being immiscible with said solution of the refrigerant and immiscible with the liquid refrigerant, an evaporator, means for directing the liquid refrigerant from said receptacle into said evaporator, an absorber for receiving the refrigerant in a gaseous state from the evaporator, means for circulating a liquid through the absorber at a rate proportional to the quantity of the gaseous refrigerant present in the absorber.

5. In refrigerating apparatus, a vessel having a solution of a refrigerant therein, a receptacle having liquid refrigerant therein, a tube communicating said vessel with said receptacle, a supply of fluid filling the cross-section of the tube, said fluid being immiscible with said solution of the refrigerant and immiscible with the liquid refrigerant, means for cooling said tube, an evaporator, means for directing the liquid refrigerant from said receptacle into said evaporator, an absorber for receiving the refrigerant in a gaseous state from the evaporator, a liquid within said absorber, and means driven by the refrigerant in a gaseous state from an upper portion of said receptacle for moving the liquid from the absorber through said vessel.

6. A refrigerating apparatus comprising, a vessel having a solution of a refrigerant therein, a receptacle having liquid refrigerant therein, a tube connecting said vessel with said receptacle, a supply of fluid filling said tube, said fluid being immiscible with said solution of the refrigerant and immiscible with the liquid refrigerant, an evaporator, means for directing the liquid refrigerant from said receptacle into said evaporator, an absorber for receiving the liquid refrigerant in a gaseous state from the evaporator, a liquid within the absorber for absorbing the gaseous refrigerant, a motor, a pump driven by said motor for moving the liquid from said absorber through said vessel, a pipe for supplying the refrigerant in a gaseous state from an upper portion of said receptacle to drive said motor, and a pipe for conveying exhaust gases of said motor into said absorber.

7. In a refrigerating apparatus, a vessel having a solution of a refrigerant therein, an evaporator, a receptacle having liquid refrigerant therein arranged within said evaporator, a tube communicating said vessel with said receptacle, a supply of fluid filling the cross-section of said tube, said fluid being immiscible with said solution of the refrigerant and immiscible with the liquid refrigerant, and means for cooling said tube.

8. In refrigerating apparatus, a vessel having a solution of a refrigerant therein, a receptacle having liquid refrigerant therein arranged above said vessel, a vertical tube connecting said vessel with said receptacle, a supply of fluid within said tube providing a vertical column of the fluid between the receptacle and the vessel, said fluid being immiscible with said solution of the refrigerant and immiscible with the liquid refrigerant, and a valve for preventing the liquid refrigerant within said receptacle from flowing downwardly into said vessel.

AUDOIN D'HALLOY.

REFERENCES CITED

The following references are of record in the file of this patent:

UNITED STATES PATENTS

| Number | Name | Date |
| --- | --- | --- |
| 131,783 | Reece | Oct. 1, 1872 |
| 1,949,651 | Maiuri | Nov. 6, 1934 |
| 2,048,355 | Sarnmark | July 21, 1936 |